US012577787B2

(12) United States Patent
Boucké

(10) Patent No.: US 12,577,787 B2
(45) Date of Patent: Mar. 17, 2026

(54) DECORATIVE PANEL, IN PARTICULAR A WALL, CEILING OR FLOOR PANEL, AND A COVERING CONSTRUCTED BY A MULTITUDE OF SUCH PANELS

(71) Applicant: I4F Licensing NV, Turnhout (BE)

(72) Inventor: Eddy Alberic Boucké, Turnhout (BE)

(73) Assignee: i4F Licensing NV, Turnhout (BE)

( * ) Notice: Subject to any disclaimer, the term of this patent is extended or adjusted under 35 U.S.C. 154(b) by 316 days.

(21) Appl. No.: 18/270,877

(22) PCT Filed: Jan. 7, 2022

(86) PCT No.: PCT/EP2022/050228

§ 371 (c)(1),
(2) Date: Jul. 5, 2023

(87) PCT Pub. No.: WO2022/148825

PCT Pub. Date: Jul. 14, 2022

(65) Prior Publication Data

US 2024/0060314 A1 Feb. 22, 2024

(30) Foreign Application Priority Data

Jan. 7, 2021 (NL) ..................................... 2027284

(51) Int. Cl.
*E04F 13/08* (2006.01)
*B44F 1/02* (2006.01)

(52) U.S. Cl.
CPC ...... *E04F 13/0871* (2013.01); *E04F 13/0866* (2013.01); *E04F 13/0894* (2013.01); *B44F 1/02* (2013.01)

(58) Field of Classification Search
CPC .............. E04F 13/0871; E04F 13/0866; E04F 13/0894; B44F 1/02
See application file for complete search history.

(56) References Cited

U.S. PATENT DOCUMENTS

| | | | | |
|---|---|---|---|---|
| 4,126,727 A | 11/1978 | Kaminski | | |
| 8,720,150 B2 * | 5/2014 | Hannig | E04F 13/0894 | 52/592.1 |

(Continued)

FOREIGN PATENT DOCUMENTS

| | | |
|---|---|---|
| CN | 102245396 A | 11/2011 |
| EP | 3521055 A1 | 8/2019 |

(Continued)

OTHER PUBLICATIONS

Koltsova et al., "To the Question of Determining the Limiting Particle Size of Corundum during Grinding,". International Journal of Mechanical Engineering and Robotics Research, 2020, pp. 207-211, vol. 9, No. 2.

*Primary Examiner* — Gisele D Ford
(74) *Attorney, Agent, or Firm* — The Webb Law Firm

(57) ABSTRACT

Panel, in particular a wall, ceiling or floor panel, of a planar design having a top side, a bottom side and side edges, which panel is constructed from a laminate structure of layers that are adhered to each other, wherein the layers include a core layer, a decorative layer which includes a decorative image on its upper side, which decorative layer is provided directly or indirectly on an upper side of the core layer, and a top coat layer that is transparent and includes a layer of transparent matrix material, which top coat layer is provided directly or indirectly on an upper side of the decorative layer.

19 Claims, 2 Drawing Sheets

(56) References Cited

U.S. PATENT DOCUMENTS

| | | | | |
|---|---|---|---|---|
| 11,225,800 | B2 * | 1/2022 | De Rick | E04F 15/02038 |
| 11,603,668 | B2 * | 3/2023 | Boucké | E04F 15/105 |
| 11,702,848 | B2 * | 7/2023 | Boucké | E04F 15/02038 52/588.1 |
| 12,084,870 | B2 * | 9/2024 | Boucké | E04F 15/02038 |
| 12,158,012 | B2 * | 12/2024 | Boucké | E04F 15/102 |
| 2003/0138617 | A1 * | 7/2003 | Courtoy | B41M 7/0045 428/304.4 |
| 2009/0260307 | A1 * | 10/2009 | Thiers | B44F 9/02 52/311.1 |
| 2011/0263783 | A1 | 10/2011 | Son | |
| 2011/0300372 | A1 | 12/2011 | DiDavide et al. | |
| 2016/0201324 | A1 | 7/2016 | Hakansson et al. | |
| 2018/0238059 | A1 * | 8/2018 | Thomas | C04B 24/2641 |
| 2018/0244877 | A1 * | 8/2018 | Miyamoto | B32B 27/20 |
| 2020/0016629 | A1 * | 1/2020 | Pankoke | B41M 5/0047 |
| 2020/0290311 | A1 * | 9/2020 | Kim | A45D 33/006 |
| 2020/0325689 | A1 * | 10/2020 | Li | E04F 13/18 |
| 2020/0355974 | A1 * | 11/2020 | Kim | B32B 3/30 |
| 2021/0016540 | A1 * | 1/2021 | Jo | G02B 5/003 |
| 2023/0083165 | A1 * | 3/2023 | Li | E04F 15/107 |
| 2023/0158771 | A1 * | 5/2023 | Hayata | B32B 17/06 428/1.3 |
| 2023/0399858 | A1 * | 12/2023 | Boucké | E04F 15/102 |

FOREIGN PATENT DOCUMENTS

| | | | |
|---|---|---|---|
| WO | 2010075922 | A1 | 7/2010 |
| WO | 2011129755 | A2 | 10/2011 |
| WO | 2014011110 | A1 | 1/2014 |
| WO | 2016114710 | A1 | 7/2016 |
| WO | 2020114642 | A1 | 6/2020 |

* cited by examiner

DECORATIVE PANEL, IN PARTICULAR A WALL, CEILING OR FLOOR PANEL, AND A COVERING CONSTRUCTED BY A MULTITUDE OF SUCH PANELS

CROSS-REFERENCE TO RELATED APPLICATIONS

This application is the United States national phase of International Application No. PCT/EP2022/050228 filed Jan. 7, 2022, and claims priority to The Netherlands Patent Application No. 2027284 filed Jan. 7, 2021, the disclosures of which are hereby incorporated by reference in their entireties.

BACKGROUND OF THE INVENTION

Field of the Invention

The present invention relates to a decorative panel, in particular a wall, ceiling or floor panel, of a planar design having a top side, a bottom side and side edges, which panel is constructed from a laminate structure of layers that are adhered to each other, wherein the layers include:

at least one core layer, at least one decorative layer which comprises a decorative image on its upper side, which decorative layer is provided directly or indirectly on an upper side of the core layer, and at least one top coat layer that is affixed, either directly or indirectly, on an upper side of the decorative layer.

Furthermore, the invention relates to a decorative covering constructed by a multitude of such panels that are positioned adjacent to each other.

Description of Related Art

In the field of laminate panels, such a basic structure is well known, and renders the panel having a visual appearance which is determined by the decorative image of the decorative layer. The top coat layer primarily functions as a protective layer which resists any abrasive forces that are subjected to the upper surface of the top side of the panel during its use.

In regard of the visual appearance of the panel, it has been found that the decorative image which is intrinsically of two dimensional proportions, may be further enhanced to achieve a more convincing and natural effect to the viewer. In the field, it has been proposed that the image perceived by a viewer may be enhanced tactically by providing the top surface of the panel with a relief structure that corresponds with the decorative image. This synchronous technique is also referred to in the field as embossing in register, and is nowadays commonly applied in panels. In this way, various area structures and different structure depths can be realized.

Still, the visual appearance of the panel itself leaves room for further improvement in regard of the inherent visual effects of the decorative image, in particular when the decorative image depicts three dimensional structures, or when starkly contrasting parts are included in the decorative image.

SUMMARY OF THE INVENTION

In order to enhance the visual appearance of the decorative image, the present invention in accordance with a first aspect thereof, provides a panel of the above mentioned type, wherein:

at least one top coat layer comprises a substantially transparent matrix material and a multitude of solid particles, in particular chips, dispersed in said matrix material, wherein the solid particles, in particular chips, have different light-interacting properties than the matrix material. Preferably, a majority of the solid particles has a maximum particle diameter which is smaller than 100 micron, and preferably larger than 1 micron.

Preferably, the solid particles, in particular chips, comprise one or more of the following types of solid particles, in particular chips:

light-reflective solid particles, in particular chips, that have an outer surface of light reflective material, such that preferably more than 50% of incident light is reflected;

light-absorbing solid particles, in particular chips, that have an outer surface of light absorbing material, such that preferably more than 50% of incident light is absorbed; and/or substantially transparent solid particles, in particular chips, that are made from a substantially transparent material which is preferably transparent for more than 50% of incident light, and which has a different refractive index than the at least partially, preferably substantially, more preferably entirely, transparent matrix material.

In the panel according to the invention, the solid particles enhance or augment the decorative quality that is perceived by a person who views the top side of the panel. For instance the contrast in light and dark sections of the decorative image can be further enhanced in a natural way by the solid particles, especially by an appropriate use of light-reflective solid particles and light-absorbing solid particles. Furthermore, the solid particles augment the visual appearance of a natural depth of the image as perceived by the viewer, especially when transparent solid particles are used appropriately. At least a fraction of the light-reflective solid particles may formed by metallic particles, preferably metallic chips (metallic flakes), which are entirely made of metal or which are provided with a metal coating. The type of metal used can be of various nature, wherein preferably at least one metal is used chosen from the group consisting of: silver, copper, gold, zinc, aluminium. A bonus advantage is that these metals typically also have an antimicrobial effect, which renders the growth of bacteria, fungi and other micro-organism, on top of the panel according to the invention more difficult, which is favourable from a hygienic point of view. It is imaginable that other antimicrobial additives are added to the transparent matrix material to improve this antimicrobial effect. It is also, optionally additionally, imaginable that at least a fraction of the light-reflective solid particles may formed by solidified ink or paste particles, preferably opaque and/or semi-transparent solidified ink or paste particles. These ink or paste particles may have a metallic effect or metallic appearance, and if so this ink may also be referred to as metallic ink or metallic paste. This metallic ink may e.g. comprise an aqueous solution with a metallic powder pigment and a colorant, a water-soluble organic solvent, if required, and a water-soluble resin as a bonding agent (a binder resin), and typically a viscosity controlling agent and/or a dispersant and/or further additives. Preferably, the metallic ink comprises a natural polysaccharide and/or cellulose derivatives, to improve the ink fixability to non-absorbent materials, like typically matrix materials. These solidified ink or paste particles dispersed in the substantially transparent matrix material preferably have one or more, typically predefined, colours. Using liquid ink or paste to compose the solid particles could be preferred in case the matrix material and the solid particles are preferred applied by using a (digital) printing technique.

Furthermore, it is a prerequisite in the panel, that the microscopic size of the solid particles is such that the solid particles are virtually invisible to the human eye. As such, the particles do not hinder or compromise the basic appearance of the decorative image, while still achieving an enhancing or augmenting effect on the visual appearance as a whole. Therefore, preferably a part of the solid particles preferably has a maximum particle diameter which is smaller than 200 micron, preferably smaller than 100 micron, and preferably larger than 1 micron. However, in particular for realizing a (visual) depth feeling and/or glittering effect and/or matting effect, the solid particles, preferably chips, may have a larger size up to 20 millimetre. This larger particles, in particular chips, preferably have a size of between 200 micron and 20 millimetre, more preferably between 500 micron and 5 millimetre.

It is further preferred in the panel of the invention, that the solid particles are shaped as spheroid particles, non-spheroid particles including rectangular or polyhedral particles, and/or as chips, also referred to as flake-formed particles or slice-formed particles. It was found that such shapes of solid particles are especially suitable to achieve the intended light interacting effects. In the text below, the expression solid particles may be replaced by one or more of the abovementioned embodiments (spheroid particles, non-spheroid particles including rectangular or polyhedral particles, and/or as chips, also referred to as flake-formed particles or slice-formed particles), and where the expression chips is used, this expression may be replaced by the more generic expression solid particles.

In regard of the microscopic size of the solid particles that is applied in the invention, the following preferences apply to the size distribution of the solid particles:

- at least 80% of the solid particles have a maximum particle diameter which is smaller than 100 micron;
- the solid particles have an average maximum particle diameter which lies in the range of 0.01 micron and 100 micron, preferably in the range of 0.1 micron and 10 micron; and/or
- at least 80% of the solid particles have a maximum particle diameter which lies in the range of 0.01 micron and 100 micron, preferably in the range of 0.1 micron and 10 micron.

These preferences were found particularly effective for the invention. As indicated above, also larger solid particles, in particular chips, may be applied to enhance a depth effect (3D effect) and/or glittering effect and/or matting effect and/or artificial shadow effects of the top coat layer. In this manner, e.g. artificial marble (effects) can be realized, as well as another 3D effect, which is preferably aligned with the decorative image of the decorative layer.

There is no restriction as to the shape of chips that can be used in the present invention. The examples of the chip shapes include a cylinder, and a polyhedron, e.g., a tetrahedron and hexahedron. Hexahedron shapes or other polygonal shapes are used in general. Preferably, the size of the light reflecting chip is in the range of 2 to 20 mm. The chip is preferably used in a content of 0.1 to 50% by weight of the top coat layer. The chips are typically formed by means of crushing, in particular by crushing a laminated sheet or laminated board including a polymer based layer and a light reflective layer. During crushing, chips of a predetermined size, and the thickness of chip layers can be controlled. Preferably, the solid particles, in particular chips, are composed of a composite material, which composite material preferably comprises at least one polymeric material and at least one non-polymeric material. The composite material may have a laminated structure of a first layer comprising said at least one polymer material and a second layer comprising said at least one non-polymeric material. Optionally, the chip is initially provided with at least one high specific gravity layer to improve and/or facilitate the dispersion of the chips in the matrix material. This high specific gravity layer is preferably directly adhered to the polymeric layer. This high specific gravity layer preferably has a specific gravity ranging from 1.5 to 10 g/cm$^3$, and more particularly, from 2.0 to 8.0 g/cm$^3$. Preferably, this high specific gravity layer is removed during the production process, for example by sanding of the top coat layer or by means of another surface treatment. This will expose the, preferably transparent, polymeric substance to the outside from the upper surface of the top coat layer.

Preferably, said composite material comprises at least one polymeric material and at least one light reflective non-polymeric flake. Due to the non-polymeric flake, the solid particle as such often also has a flake-like shape which qualifies the solid particles in this case as chip. The light reflective non-polymeric flake is preferably at least partially composed of a material chosen from the group consisting of: mica, metal, metal oxide, a non-metal, pearls, and glass flakes, in particular quartz glass flakes. The metals may be introduced into the layer by transfer or deposition. The pearls and glass flakes may be introduced adhering the pearls or glass flakes to the polymeric material. Preferably, the refractive index of the flake differs from the refractive index of the matrix material. Preferably, the polymeric material is at least partially composed of a vinyl polymer, preferably a polymer and/or based upon a material selected from the group consisting of: acrylates carrying an alkyl group having 1 to 20 carbon atoms, methacrylates carrying an alkyl group having 1 to 20 carbon atoms, unsaturated carboxylic acids, acid anhydrides, maleimide derivatives, vinyl esters, vinyl benzoate, vinyl chloride, vinylidene chloride, and a vinyl ester. The polymeric material may also be at least partially composed of a polymer selected from the group consisting of: an acrylic or unsaturated polyester resin, epoxy resin, polyvinyl chloride (PVC), polycarbonate (PC), polyethylene terephthalate (PET), polystyrene (PS), and styrene-methyl methacrylate (SMMA) copolymer.

Preferably, the specific gravity of the polymeric material is in the range of 0.1 to 2.0 g/cm3. Preferably, the polymeric material has a light transmissivity of 70 to 100%, which allows the reflective flake to remain visible through said polymeric material. This latter significantly reduces the need to have the chips oriented in a preferred orientation, as the light reflective flakes remain visible irrespective of the chip orientation.

The chips (or alternative solid particles) may comprise at least one filler dispersed in said polymeric material, wherein said filler selected from the group consisting of: aluminium hydroxide, magnesium hydroxide, calcium hydroxide, zirconium hydroxide, aluminium, calcium carbonate, magnesium oxide, titanium oxide, barium sulphate, silica, quartz, talc, clay, diatomaceous earth, gypsum, powder glass, montmorillonite, bentonite, pyrophyllite, kaolin, powder chalk, marble, limestone, asbestos, mullite, aluminium silicate, aluminium stearate, calcium silicate, anhydrite, α-cristobalite, and alumina white. These chip fillers are typically applied to regulate and/or compensate a difference in specific gravity between the chips and the matrix material. This latter is often important to achieve a desired dispersion of the chips (or other solid particles) within the matrix material and to prevent separation of the chips (or other solid particles) and the matrix material during production.

Preferably, the chips comprises a cured composition comprising a binder at least partially composed of a halogenated alkoxylated diacrylate oligomer and/or halogenated alkoxylated dimethacrylate oligomer. By preparing the chips by curing a resin composition comprising a binder and a reactive monomer, wherein the binder comprises a halogenated alkoxylated di(meth)acrylate oligomer. This binder type typically leads to chips having a three dimensional texture which can provide an excellent chemical resistance and thermal processability. Examples of the reactive monomers may comprise without limitation aromatic vinyl monomers, aromatic divinyl monomers, dimers thereof, alkyl or halogen substituted aromatic vinyl monomers, alkyl (meth) acrylates, and aryl (meth)acrylates.

In another embodiment of the present invention, the resin composition may further comprise second marble chips, and the marble chips may have a chip-in-chip structure, in which the second marble chips are formed within first marble chips.

In another embodiment of the present invention, the resin composition may further comprise a second resin composition having a different colour and/or transparency as compared to a first resin composition. The second resin composition may comprise a second binder and a second reactive monomer. The second binder may include a halogenated alkoxylated di(meth)acrylate oligomer, halogenated urethane acrylate, halogenated epoxy acrylate, or a combination thereof.

Preferably, the chips comprise a core encapsulated by a chip shell. The chip core may be considered as a first chip and the chip shell may be considered as a second chip, which results in a chip-in-chip structure. The composition of the first and second chips may mutually be distinctive. Typically, each chip comprises a polymeric substance and a light reflective substance.

Preferably, the difference in specific gravity between the chips and the matrix material is less than 0.5 g/cm$^3$, preferably less than 0.5 g/cm$^3$. This will typically secure a good dispersion of the chips within the matrix material. The chips typically have a specific gravity of 1.43 to 1.77 g/cm3. The matrix material preferably has a specific gravity of 1.50 to 1.85 g/cm3. Preferably, the chips have a refractive index of 1.50 to 1.80 measured in accordance with an Abbe refractometer at 25° C. The content of chips in the top coat layer is preferably situated between 0.1 to 50% by weight of the top coat layer.

Preferably in the panel according to the invention, the at least partially transparent matrix material of the top coat layer is a polymeric material, in particular a thermosetting polymer material, such as melamine-formaldehyde, or polyurethane. Such polymeric material is highly suitable as the matrix material for the top coat layer in terms of wear and tear properties, while such a matrix material also allows for the embedding of solid particles. Other polymeric materials, like thermoplastic materials, like polyvinylchloride, polyethylene, polypropylene, polycarbonate, polyethylene terephthalate, and styrene block copolymers, like styrene Isoprene Styrene (SIS) polymers, may also be used as matrix material.

Preferably, the at least partially transparent matrix comprises at least one non-polymeric additive, in particular an inorganic additive preferably selected from the group consisting of: aluminium oxide, aluminium hydroxide, barium, precipitated calcium carbonate, stone powders, silica, titanium dioxide, calcium carbonate, metal powder, and a metal salt.

The matrix material and/or the solid particles, in particular the chips, preferably comprise(s) at least one additive selected from the group consisting of colouring agents, defoaming agents, coupling agents, ultraviolet absorbing agents, light diffusing agents, polymerization inhibitors, antistatic agents, flame retardants, heat stabilizers and the like, and combinations thereof.

The matrix material is preferably at least partially transparent and/or translucent. Additionally or alternatively, the top coat layer, in particular the matrix material, comprises at least one semi-transparent and/or opaque zone. In this manner the aesthetic effect of the top coat layer may further be improved.

In the panel according to the invention, it is preferred that the decorative layer comprises one or more pigments, such that the decorative image is coloured.

Further preferred in the panel according to the invention, the decorative image depicts a pattern, for instance a natural pattern, an abstract pattern such as a geometric pattern, or a random pattern.

In order to enhance the decorative image of the panel, it is preferred that the solid particles are positioned in the transparent matrix material such that their position is in correspondence with the decorative image of the decorative layer. In this way, realistic visual effects, in particular glossy and mat effects and/or improved depth effects, can be realized. This makes it, for example, possible to imitate natural materials, like marble and wood, in a realistic manner.

It is further preferred in the panel that the transparent matrix material comprises adjacent vertical zones, wherein each vertical zone comprises a predetermined amount of solid particles which belong to one or more of the types of solid particles.

In this context, is especially preferred that the vertical zone within the transparent matrix material extends vertically between the upper side of the decorative image and a top surface of the top coat layer.

It is imaginable that the transparent matrix material comprises adjacent horizontal zones, wherein at least two horizontal zones comprises a predetermined amount of chips which belong to one or more of the types of chips, wherein the size and/or refraction index of the chips of a first horizontal zone preferably differs from the size and/or refraction index of the chip of a second horizontal zone. In this manner, the aesthetic effect of the top coat layer and of the panel as such can further be improved.

A strong enhancement of the visual appearance of the panel is attained, when the light reflective solid particles are positioned in correspondence with image parts of the decorative image that are:

- image parts of a light colour, and/or
- image parts that depict an elevated zone of a depicted relief structure.

A further enhancement of the visual appearance of the panel is attained, when the light absorbing solid particles are positioned in correspondence with parts of the decorative image that are:

- image parts of a dark colour, and/or
- image parts that depict a recessed zone of a depicted relief structure.

It is particularly preferred in the panel according to the invention, that a top surface of the top coat layer has a relief structure, which comprises recessed parts and elevated parts, which parts are provided in correspondence with the decorative image of the decorative layer. Such a relief structure is also referred to as an embossed surface, and further enhances the perception of the decorative image to a viewer.

In this context, it is preferred that the relief structure is part of a layer of transparent material that is directly or indirectly adhered onto the layer of transparent matrix material. As such, the relief structure may be formed in a transparent material that is most suitable for creating the relief structure, whereas the transparent matrix material is of a type which is not affected by the creation of the relief structure.

It is imaginable, and even preferable, that the top coat layer, or at least the transparent matrix material, preferably with the solid microscopic particles dispersed therein, is applied, either directly or indirectly, onto the decorative layer by means of a printing technique, in particular a digital printing technique. This printing process can be carried out as a single step or can be carried out as a multiple-step printing process. It is imaginable that the matrix material as present in a top coat layer is realized by applying, e.g. by means of (digital) printing) a plurality of layers of matrix material on top of each other. Preferably, these layers of matrix materials are mutually fused to eliminate the presence of visible interfaces in between two layers of matrix materials.

In a preferred embodiment, it is imaginable that firstly the first layer of matrix material is printed onto another layer of the panel, which may be the decorative layer, after which the solid particles are deposited in liquid and/or solid state, preferably by means of—digital and/or transfer—printing and/or pressing and/or rolling, after which another layer of matrix material is printed to cover the solid particles at least partially. Optionally, on top of said other layer of matrix material further solid particles may be deposited, which may subsequently be covered at least partially by a further layer of matrix material. These two latter process steps may be repeated until a desired (composed or laminated) layer or block of matrix material with solid particles therein is obtained. In case the solid (decorative) particles are initially printed by using as liquid ink (droplets), solidifying (drying or curing) of the solid particles is typically realized by means of irradiation, such as infrared irradiation and/or UV irradiation. At least partially solidifying (curing) the initially liquid decorative particles can be realized prior deposition, in particular printing, of a matrix material layer on top of said particles. However, it is also imaginable that at least partially solidifying (curing) the initially liquid decorative particles can be realized after deposition, in particular printing, of a matrix material layer on top of said particles. This may (slightly) deform the initial shape of the liquid particles from spheres or another convex shape into platelets and/or a more flattened shape, which may be beneficial to realize a desired a light effect, and hence a desired visual effect. Preferably, at least a fraction of the solid particles is positioned at a distance from the decorative layer. Preferably, at least a fraction of the solid particles is positioned at a distance from a top surface of the panel.

In an alternative embodiment, the solid particles are provided in one or more, preferably position-selective, cavities (recesses or indentations) formed in a matrix material during production of the panel. These cavities can be created mechanically, for example by brushing or pressing, although it is often more preferred to use an etching agent which is preferably (position-selectively) printed onto the, preferably uncured or partially cured, matrix material. This may facilitate the creation of a visual depth effect. Alternatively, and possibly additionally, a top surface of a matrix material layer may have a profiled (uneven) top surface, wherein one or more, preferably position-selective, protrusion of formed at the top surface by said matrix material. On top of said protrusion(s) and/or in between adjacent protrusions, the solid particles may be applied (as said optionally initially in liquid state). The aforementioned cavities and/or protrusions in at least one layer of matrix material may be used to form at least a part of an embossing structure of the panel. In a preferred embodiment, at least a part of the cavities and/or protrusions is aligned in register with at least a part of at least one decor image formed by the decorative (print) layer.

Here it is for example imaginable that firstly the first layer of matrix material is printed onto another layer of the panel, which may be the decorative layer, after which the solid particles are deposited in liquid and/or solid state, preferably by means of—digital and/or transfer—printing and/or pressing and/or rolling, after which another layer of matrix material is printed to cover the solid particles at least partially. Optionally, on top of said other layer of matrix material further solid particles may be deposited, which may subsequently be covered at least partially by a further layer of matrix material.

As mentioned above, at least one top coat layer comprises a substantially transparent or semi-transparent matrix material with (different and/or distinctive) solid particles dispersed therein. It is well imaginable that the matrix material with the solid particles dispersed therein constitutes a part of said top coat layer. Here, it is for example imaginable that the matrix material with the solid particles dispersed therein forms a sublayer of said coat layer. It is also imaginable that the matrix material with the solid particles dispersed therein forms one or more vertically extending (distant) zones or portions of the top coating layer, wherein other material is used in the top coat layer to compose remaining part of the top coat layer. It is imaginable that the panel comprises a plurality of top coat layers. It is imaginable that one or more of said top coat layers are free of any matrix material with solid particles dispersed therein. It is imaginable that a plurality of said top coat layers comprises matrix material with the solid particles dispersed therein, wherein it is furthermore imaginable that matrix material of different layers are mutually connected. It is imaginable that a plurality of said top coat layers comprises matrix material with the solid particles dispersed therein, wherein it is furthermore imaginable that at least two top coat layer comprising matrix material with solid particles dispersed therein are separated by at least one top coat layer which is free of matrix material with solid particles dispersed therein.

Preferably, at least one top coat layer is configured to act as adhesive layer to affix two neighbouring layers together. To this end, this top layer(s) could for example comprise a hot melt adhesive and/or thermoplastic resin. A specific polymer that could be used in such top coat layer is a styrenic block copolymer, preferably a styrene isoprene styrene (SIS) polymer. This SIS polymer is based on styrene and isoprene and has the lowest hardness and lowest viscosity of all the styrenic block copolymers. These thermoplastic resins are easy to process and typically leads to a high strength, (somewhat) elastic top coat layer.

At least one the top coat layer is at least partially formed by a UV lacquer coating. These UV lacquer coatings generally have high resistance and resistance to mechanical, physical and chemical influences, in particular high scratch resistance. The surface of such lacquer layers after curing usually appears shiny or dull, depending on the composition of the lacquer used. A partially matted panel according to the invention with consistently high scratch resistance may be desired to improve the visual appearance of said panel, which can be achieved, for example, by applying a UV lacquer which is partially (or entirely) cured with excimer radiation, preferably having a wavelength in the range from 110 to 300 nm. Preferably, fully hardening of said UV lacquer layer is achieved by subsequently irradiating said UV lacquer layer by means of UV radiation in a wavelength range from 300 to 500 nm.

Preferably, each top coat layer comprises a material which is cured by means of UV radiation. Preferably, at least one top coat layer may be configured to act as embossing layer to provide the panel a profiled top surface, and more preferably such that the profiled top surface is in register with the decorative image of the decorative layer. This embossing layer may at least partially be formed by the matrix material with the solid particles dispersed therein and/or may be formed in another top coat layer which preferably comprises a thermoplastic resin, such as a SIS copolymer. The embossing layer is provided with a profiled top surface which is still visible and feelable on a top surface of the panel as such. The profiled top surface of the embossing layer can be realized mechanically, for example by means of pressing of profile into a top surface of the embossing layer, and/or by means of (digital) printing and/or chemically, for example by etching away a (position-selective) part of a top surface of the embossing structure. The top coat layers together may be referred to as wear layer. An upper top coat layer preferably comprises polyurethane due to its relatively good scratch resistance. All top coat layers are preferably substantially transparent and/or semi-transparent to allow the decorative layer to remain visible in the panel as such. However, it is imaginable that one or more top coat layer comprises one or more opaque (non-transparent) or semi-transparent zones, wherein each zone may be provided with a predefined colour, a predefined pattern (or pattern part), and/or a predefined image (or image part). This would leads to an attractive visual depth effect. These opaque zones may e.g. be realized by means of digital printing. Here, it is for example conceivable that at least one top coat layer constitutes an optical mask layer with position-selective transparent parts, which may be free of any material, and position-selective opaque and/or semi-transparent parts.

At least one top coat layer may be applied by means of (digital) printing. It is also conceivable that at least one top coat layer is applied by means of rolling and/or pouring and/or spraying.

Preferably in the panel according to the invention, at least two layers of the panel are adhered to each other either by fusion of the materials of the respective layers, and/or by application of an adhesive material at the interface of the respective layers.

Dependent on the respective materials used in the respective layers, the choice is expediently made which type of adhesion is most appropriate.

It is advantageous in the panel according to the invention, when the core layer is at least partially made of a polymeric material, which is preferably based on a mixture of recycled polymeric material and virgin polymeric material. Such a core layer can be manufactured at low costs, and provides an attractive stiffness while being light-weight. Examples of suitable materials are polyurethane and polyvinylchloride. Optionally, these polymers are provided with one or more fillers, preferably inert fillers, such as calcium carbonate and/or chalk.

Preferably, the base material of the core comprises a (main) polymer, preferably a thermoplastic material, which is more preferably chosen from the group consisting of: PVC, PET, PP, PS, thermoplastic polyurethane (TPU), PE, in particular MDPE and/or HDPE; and combinations thereof. PS may be in the form of expanded PS (EPS) in order to further reduce the density of the floor covering element, which leads to a saving of costs and facilitates handling of the panels. Also in case another thermoplastic material is used, this material may be applied in foamed state in the core to reduce the density and costs. Nevertheless, it is also imaginable that the thermoplastic material used as main polymer is a solid polymer (i.e. an unfoamed polymer). Preferably, at least a fraction of the polymer used may be formed by recycled thermoplastic, such a recycled PVC or recycled PU. It is conceivable that a mix of virgin and recycled thermoplastic material is used to compose at least a part of the core. Instead of the thermoplastic material, also a thermoset polymer may be used, such as thermoset polyurethane.

At least a part of the core (layer) may be made of a composite of at least one polymer and at least one non-polymeric material. The composite of the core layer preferably comprises one or more fillers, wherein at least one filler is preferably selected from the group consisting of: talc, chalk, wood, calcium carbonate, titanium dioxide, calcined clay, porcelain, glass, carbon particles, silicon particular, a(nother) mineral filler, a(nother) natural filler, a(nother) (auxiliary) polymer, such as an elastomer and/or latex. It is also imaginable that rubber and/or elastomeric parts (particles) are dispersed within the composite to improve the flexibility and/or impact resistance at least to some extent. The core may (thus) be rigid, semi-flexible, or flexible, and so can be the floor covering element as such. The filler may be formed by fibres, such as glass fibers or synthetic or genuine leather fibers, and/or may be formed by dust-like particles. Here, the expression "dust" is understood as small dust-like particles (powder), like bamboo dust, wood dust, cork dust, or non-wood dust, like mineral dust, stone powder, in particular cement, and combinations thereof. The average particle size of the dust is preferably between 14 and 20 micron, more preferably between 16 and 18 micron. The primary role of this kind of filler is to provide the core, and the panel as such, sufficient hardness and/or to decrease the cost price of the core, and hence of the panel. Moreover, this kind of filler will typically also improve the impact strength of the core and of the panel as such. Preferably, the filler content in the composite material of the core is between 30 and 75% by weight of the composite material of the core, more preferably between 50 and 60% by weight of the composite material of the core. Preferably, the polymer content in the composite material of the core is between 25 and 70% by weight of the composite material of the core, more preferably between 40 and 50% by weight of the composite material of the core. The polymer can either be foamed or unfoamed. Preferably, the composite of the core comprises at least one filler selected from the group consisting of: a salt, a stearate salt, calcium stearate, and zinc stearate. Stearates have the function of a stabilizer, and lead to a more beneficial processing temperature, and counteract decomposition of components of the composite during processing and after processing, which therefore provide long-term stability. Instead of or in addition to a stearate, for example calcium zinc may also be used as stabilizer. The weight content of the stabilizer(s) in the composite will preferably be between 1 and 5%, and more preferably between 1.5 and 4%. The composite of the core preferably comprises at least one impact modifier comprising at least one alkyl methacrylate, wherein said alkyl methacrylate is preferably chosen from the group consisting of: methyl methacrylate, ethyl methacrylate, propyl methacrylate, isopropyl methacrylate, t-butyl methacrylate and isobutyl methacrylate. The impact modifier typically improves the product performance, in particular the impact resistance. Moreover, the impact modifier typically toughens the core layer and can therefore also be seen as toughening agent, which further reduces the risk of breakage. Often, the modifier also facilitates the production process, for example, as already addressed above, in order to control the formation of the foam with a relatively consistent (constant) foam structure. The weight content of the impact modifier in the composite will preferably be between 1 and 9%, and more preferably between 3 and 6%. At least one plastic material used in the core layer is preferably free of any (toxic) plasticizer in order to increase the desired rigidity of the core layer, which is, moreover, also favourable from an environmental point of view. The core and/or another layer of the panel may comprise wood-based material, for example, MDF, HDF, wood dust, bamboo, prefabricated wood, more particularly so-called engineered wood. This wood-based material may be part of a composite material of the core. Alternatively, the core is at least partially composed of another base material, such as a mineral material, like magnesium oxide, magnesium hydroxide, gypsum, (lightweight) concrete, and/or clay; and/or a wood or a wood-based material, such as HDF or MDF, or any other thermoplastic-free material, may be used as base material.

The density of the core typically varies from about 0.1 to 1.5 grams/cm3, preferably from about 0.2 to 1.4 grams/cm3, more preferably from about 0.3 to 1.3 grams/cm3, even more preferably from about 0.4 to 1.2 grams/cm3, even more preferably from about 0.5 to 1.2 grams/cm3, and most preferably from about 0.6 to 1.2 grams/cm3. It is imaginable that each panel comprises a plurality of core (sub)layers. Different core (sub)layers may have either identical compositions or different compositions, and/or different densities.

In the panel according to the invention it is attractive when the decorative image is directly printed on the core layer, or is printed on a separate layer that is, directly or indirectly, applied onto the core layer. It may be preferred to apply at least one layer on top the core layer before applying a decorative layer. It may e.g. be preferred to apply at least one primer layer and/or at least one base coat layer on top of the core layer before applying the decorative image. More preferably, it is advantageous in case a primer layer is applied directly on the core, wherein a first base coat layer is applied directly on the primer layer, and wherein a second base coat layer is directly on the first base coat layer. Preferably, at least one decorative image or print or pattern is digitally printed, directly or indirectly onto core layer, and preferably directly onto the primer layer and/or directly onto the first base coat layer (if applied) and/or directly onto the second base coat layer (if applied). The first base coat layer may optionally be omitted. The primer may optionally (also) be omitted. It is also, optionally additionally, imaginable that the decorative image, which may include a plurality of decorative images, patterns and/or prints, is preprinted onto a film, typically a paper film and/or a thermoplastic film, which together define the decorative layer, and which could be affixed as such, either directly or indirectly, onto the core layer.

The following dimensional properties of the panel according to the invention are particularly preferred:

- the planar design is of a rectangular or hexagonal shape;
- the panel has a length in the range of 0.40 to 2.0 m, a width in the range of 70 to 180 mm, and an overall thickness of 2 to 20 mm, preferably 3 to 12 mm; and/or
- the core layer has a thickness of 2 mm to 7 mm, and/or the top coat layer has a thickness of 1 mm to 5 mm.

In the panel according to the invention, it is further preferred that the laminated layers of the panel further include a backing layer that is directly or indirectly adhered on a bottom side of the core layer. The backing layer may be provided with additional properties that contribute to shielding the core layer from the substrate, especially in terms of forming a moisture barrier. The backing layer furthermore may be of flexible material which accommodates to any irregularities on the substrate surface.

In the panel it is especially preferred that the panel comprises at least two opposite side edges which are provided with respective interconnecting profiles that are complementary to each other, such as a tongue and a groove profile.

As such, the panel allows for the construction of a covering for a floor, wall, or ceiling, wherein a multitude of adjacent panels are interconnected to each other.

In this context, it is advantageous that the interconnecting profiles allow for a coupling of two panels by a vertical and/or an angling movement of the respective side edges. Such a method of coupling is easy to accomplish for a user who is constructing a covering from a multitude of panels.

In a second aspect, the invention further relates to decorative covering, such as a floor covering, ceiling covering, or wall covering constructed by a multitude of adjacent, preferably interconnected, panels according to the invention. Such a covering profits likewise from the same visual advantages that are achieved by each individual panel.

Preferred embodiment of the invention are illustrated in the non-limitative set of clauses presented below.

1. Decorative panel, in particular a wall, ceiling or floor panel, of a planar design having a top side, a bottom side and side edges, which panel is constructed from a laminate structure of layers that are adhered to each other, wherein the layers include:
   - at least one core layer,
   - at least one decorative layer which comprises a decorative image, which decorative layer is affixed, either directly or indirectly, on an upper side of the core layer, and
   - at least one substantially transparent top coat layer, affixed, either directly or indirectly, on an upper side of the decorative layer, wherein said top coat layer comprises an at least partially, preferably substantially, transparent matrix material, and a plurality of solid particles dispersed in said matrix material, wherein a majority of the solid particles preferably has a maximum particle diameter which is smaller than 100 micron, wherein the solid particles have light-interacting properties and comprise one or more of the following types of solid particles:
   - light reflective solid particles that have an outer surface of light reflective material, such that preferably more than 50% of incident light is reflected; and/or
   - light absorbing solid particles that have an outer surface of light absorbing material, such that preferably more than 50% of incident light is absorbed; and/or substantially transparent solid particles that are made from a substantially transparent material which is preferably transparent for more than 50% of incident light, and which has a different refractive index than the matrix material.

2. Panel according to clause 1, wherein the solid particles are shaped as spheroid particles, non-spheroid particles including rectangular or polyhedral particles, and/or flake-formed particles.

3. Panel according to one of the preceding clauses, wherein at least 80% of the solid particles have a maximum particle diameter which is smaller than 100 micron.

4. Panel according to one of the preceding clauses, wherein the solid particles have an average maximum particle diameter which lies in the range of 0.01 micron and 100 micron, preferably in the range of 0.1 micron and 10 micron.

5. Panel according to one of the preceding clauses, wherein at least 80% of the solid particles have a maximum particle diameter which lies in the range of 0.01 micron and 100 micron, preferably in the range of 0.1 micron and 10 micron.

6. Panel according to one of the preceding clauses, wherein the transparent matrix material of the top coat layer is a polymeric material, in particular a thermosetting polymer material, such as melamine-formaldehyde or polyurethane.

7. Panel according to one of the preceding clauses, wherein the decorative layer comprises one or more pigments, such that the decorative image is coloured.

8. Panel according to one of the preceding clauses, wherein the decorative image depicts a pattern, for instance a natural pattern, an abstract pattern such as a geometric pattern, or a random pattern.

9. Panel according to one of the preceding clauses, wherein the solid particles are positioned in the transparent matrix material such that their position is in correspondence with the decorative image of the decorative layer.

10. Panel according to one of the preceding clauses, wherein the transparent matrix material comprises adjacent vertical zones, wherein each vertical zone comprises a predetermined amount of solid particles which belong to one or more of the types of solid particles.

11. Panel according to clause 10, wherein the vertical zone within the transparent matrix material extends vertically between the upper side of the decorative image and a top surface of the top coat layer.

12. Panel according to one of the preceding clauses, wherein the light reflective solid particles are positioned in correspondence with image parts of the decorative image that are:

image parts of a light colour, and/or image parts that depict an elevated zone of a depicted relief structure.

13. Panel according to one of the preceding clauses, wherein the light absorbing solid particles are positioned in correspondence with parts of the decorative image that are:

image parts of a dark colour, and/or image parts that depict a recessed zone of a depicted relief structure.

14. Panel according to one of the preceding clauses, wherein a top surface of the top coat layer has a relief structure, which comprises recessed parts and elevated parts, which parts are provided in correspondence with the decorative image of the decorative layer.

15. Panel according to clause 14, wherein the relief structure is part of a layer of transparent material that is directly or indirectly adhered onto the layer of transparent matrix material.

16. Panel according to one of the preceding clauses, wherein the upper surface of the top coat layer is provided with an additional wear layer.

17. Panel according to one of the preceding clauses, wherein the layers of the panel are adhered to each other either by fusion of the materials of the respective layers, or by application of an adhesive material at the interface of the respective layers.

18. Panel according to one of the preceding clauses, wherein the core layer is at least partially made of a polymeric material, and is preferably based on a mixture of recycled polymeric material and virgin polymeric material.

19. Panel according to one of the preceding clauses, wherein the decorative image is directly printed on the core layer, or is printed on a separate layer that is applied onto the core layer.

20. Panel according to one of the preceding clauses, wherein the planar design is of a rectangular or hexagonal shape.

21. Panel according to one of the preceding clauses, wherein the panel has a length in the range of 0.40 to 2.0 m, a width in the range of 70 to 180 mm, and an overall thickness of 2 to 20 mm, preferably 3 to 12 mm.

22. Panel according to one of the preceding clauses, wherein the core layer has a thickness of 2 mm to 7 mm, and/or the top coat layer has a thickness of 1 mm to 5 mm.

23. Panel according to one of the preceding clauses, wherein the laminated layers of the panel further include a backing layer that is directly or indirectly adhered on a bottom side of the core layer.

24. Panel according to one of the preceding clauses, wherein the panel comprises at least two opposite side edges which are provided with respective interconnecting profiles that are complementary to each other, such as a tongue and a groove profile.

25. Panel according to clause 24, wherein the interconnecting profiles allow for a coupling of two panels by a vertical and/or an angling movement of the respective side edges.

26. Panel according to clause 24 or 25, wherein the panel comprises at a first pair of opposite side edges a first pair of interconnecting profiles that are complementary to each other, such as a tongue and a groove profile, and at a second pair of opposite side edges a second pair of interconnecting profiles that are complementary to each other, such as a tongue and a groove profile, wherein, preferably, the first pair of interconnecting profiles and the second pair of interconnecting profiles are differently shaped.

27. Panel according to one of the preceding clauses, wherein at least a fraction of the solid particles is formed by solidified ink, preferably solidified opaque or semi-transparent ink.

28. Panel according to one of the preceding clauses, wherein at least a fraction of the solid particles have a metallic appearance.

29. Panel according to one of the preceding clauses, wherein at least a fraction of the solid particles is positioned at a distance from both the decorative layer and a top surface of the panel.

30. Panel according to one of the preceding clauses, wherein the solid particles are spatially dispersed in the matrix material, such that the distance between at least one solid particle and the decorative layer differs from the distance between at least one other solid particle and the decorative layer.
31. Panel according to one of the preceding clauses, wherein the chips are composed of a composite material, which composite material preferably comprises at least one polymeric material and at least one non-polymeric material.
32. Panel according to one of the preceding clauses, wherein the chips comprises at least one polymeric material and at least one light reflective non-polymeric flake.
33. Panel according to clause 32, wherein the light reflective non-polymeric flake is at least partially composed of a material chosen from the group consisting of: mica, metal, metal oxide, a non-metal, pearls, and glass flakes, in particular quartz glass flakes.
34. Panel according to clause 32 or 33, wherein the polymeric material is at least partially composed of a vinyl polymer, preferably a polymer and/or based upon a material selected from the group consisting of: acrylates carrying an alkyl group having 1 to 20 carbon atoms, methacrylates carrying an alkyl group having 1 to 20 carbon atoms, unsaturated carboxylic acids, acid anhydrides, maleimide derivatives, vinyl esters, vinyl benzoate, vinyl chloride, vinylidene chloride, and a vinyl ester.
35. Panel according to one of clauses 32-34, wherein the polymeric material is at least partially composed of a polymer selected from the group consisting of: an acrylic or unsaturated polyester resin, epoxy resin, polyvinyl chloride (PVC), polycarbonate (PC), polyethylene terephthalate (PET), polystyrene (PS), and styrene-methyl methacrylate (SMMA) copolymer.
36. Panel according to one of clauses 32-35, wherein the specific gravity of the polymeric material is in the range of 0.1 to 2.0 $g/cm^3$.
37. Panel according to one of clauses 32-36, wherein the polymeric material has a light transmissivity of 70 to 100%.
38. Panel according to one of clauses 32-37, wherein said chips additionally comprises at least one filler dispersed in said polymeric material, wherein said filler selected from the group consisting of: aluminium hydroxide, magnesium hydroxide, calcium hydroxide, zirconium hydroxide, aluminium, calcium carbonate, magnesium oxide, titanium oxide, barium sulphate, silica, quartz, talc, clay, diatomaceous earth, gypsum, powder glass, montmorillonite, bentonite, pyrophyllite, kaolin, powder chalk, marble, limestone, asbestos, mullite, aluminium silicate, aluminium stearate, calcium silicate, anhydrite, α-cristobalite, and alumina white.
39. Panel according to one of clauses 32-38, wherein said composite material comprises a laminate of a first layer based upon said at least one polymeric material, and a second layer based upon at least one light reflective non-polymeric flake.
40. Panel according to one of the preceding clauses, wherein the chips comprises a cured composition comprising a binder at least partially composed of a halogenated alkoxylated diacrylate oligomer and/or halogenated alkoxylated dimethacrylate oligomer.
41. Panel according to one of the preceding clauses, wherein the chips comprise a core encapsulated by a chip shell.
42. Panel according to one of the preceding clauses, wherein the difference in specific gravity between the chips and the matrix material is less than 0.5 g/cm3.
43. Panel according to one of the preceding clauses, wherein the chips have a specific gravity of 1.43 to 1.77 g/cm3.
44. Panel according to one of the preceding clauses, wherein the matrix material has a specific gravity of 1.50 to 1.85 g/cm3.
45. Panel according to one of the preceding clauses, wherein the specific gravity difference between the matrix material and the chips is 1.85 g/cm3 or less.
46. Panel according to one of the preceding clauses, wherein the content of chips in the top coat layer is situated between 0.1 to 50% by weight of the top coat layer.
47. Panel according to one of the preceding clauses, wherein the chips are crushed chips.
48. Panel according to one of the preceding clauses, wherein the average size of the chips is situated in between 3 micron and 20 millimetre.
49. Panel according to one of the preceding clauses, wherein the at least partially transparent matrix material of the top coat layer comprises a polymeric material, in particular a vinyl polymer and/or a thermosetting polymer material, such as melamine-formaldehyde or polyurethane; and optionally at least one non-polymeric additive, in particular an inorganic additive preferably selected from the group consisting of: aluminium oxide, aluminium hydroxide, barium, precipitated calcium carbonate, stone powders, silica, titanium dioxide, calcium carbonate, metal powder, and a metal salt.
50. Panel according to one of the preceding clauses, wherein the top coat layer, in particular the matrix material, comprises at least one semi-transparent and/or opaque zone.
51. Panel according to one of the preceding clauses, wherein the top coat layer is a sanded layer.
52. Panel according to one of the preceding clauses, wherein the decorative image is digitally printed.
53. Panel according to one of the preceding clauses, wherein the transparent matrix material comprises adjacent horizontal zones, wherein at least two horizontal zones comprises a predetermined amount of chips which belong to one or more of the types of chips, wherein the size of the chips of a first horizontal zone preferably differs from the size of the chip of a second horizontal zone.
54. Panel according to one of the preceding clauses, wherein at least a part of the top coat layer, in particular the surface of the top coat layer, is digitally printed.
55. Panel according to one of the preceding clauses, wherein the top layer comprises solid particles having light-interacting properties and comprise one or more of the following types of solid particles:

light reflective solid particles that have an outer surface of light reflective material, such that preferably more than 50% of incident light is reflected; and/or light absorbing solid particles that have an outer surface of light absorbing material, such that preferably more than 50% of incident light is absorbed; and/or substantially transparent solid particles that are made from a substantially transparent material which is preferably transparent for more than 50% of incident light, and which has a different refractive index than the matrix material;

and, wherein at least a fraction of the solid particles is formed by solidified ink, preferably solidified opaque or semi-transparent ink.

56. Panel according to one of the preceding clauses, wherein the top coat layer comprises aluminium oxide particles dispersed within the matrix material, and wherein the top coat layer comprises, in addition to said aluminium oxide particles, a plurality of solid particles dispersed in said matrix material, said solid particles have light-interacting properties and comprise one or more of the following types of solid particles:

light reflective solid particles that have an outer surface of light reflective material, such that preferably more than 50% of incident light is reflected; and/or light absorbing solid particles that have an outer surface of light absorbing material, such that preferably more than 50% of incident light is absorbed; and/or substantially transparent solid particles that are made from a substantially transparent material which is preferably transparent for more than 50% of incident light, and which has a different refractive index than the matrix material.

57. Decorative covering, such as a floor covering, ceiling covering, or wall covering constructed by a multitude of adjacent, preferably interconnected, panels according to one of the preceding clauses.

BRIEF DESCRIPTION OF THE DRAWINGS

The invention will be further elucidated with reference to preferred non-limitative embodiments of the invention that are shown in the appended figures, wherein.

DESCRIPTION OF THE INVENTION

Figure 1:
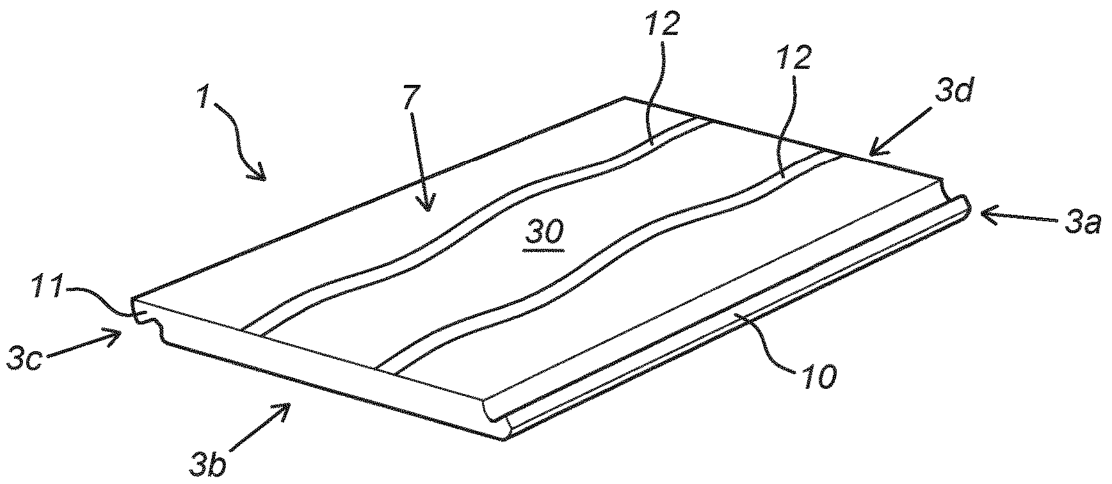
FIG. 1 shows in perspective a panel according to the invention.

FIG. 1 shows a panel 1 suitable as a floor, ceiling or wall panel, which panel is of a planar design having an top side 7, a bottom side and side edges 3*a-d* which comprise a first side edge 3*a* provided with a first profile 10 and a second side edge 3*c* provided with a second profile 11. A top coat layer 30 is present at the top side 7 of the panel which is made of a transparent matrix material. Through the top coat layer 30, a decorative image is visible which comprises grain lines 12 which mimic the appearance of natural wood panels.

Figure 2:
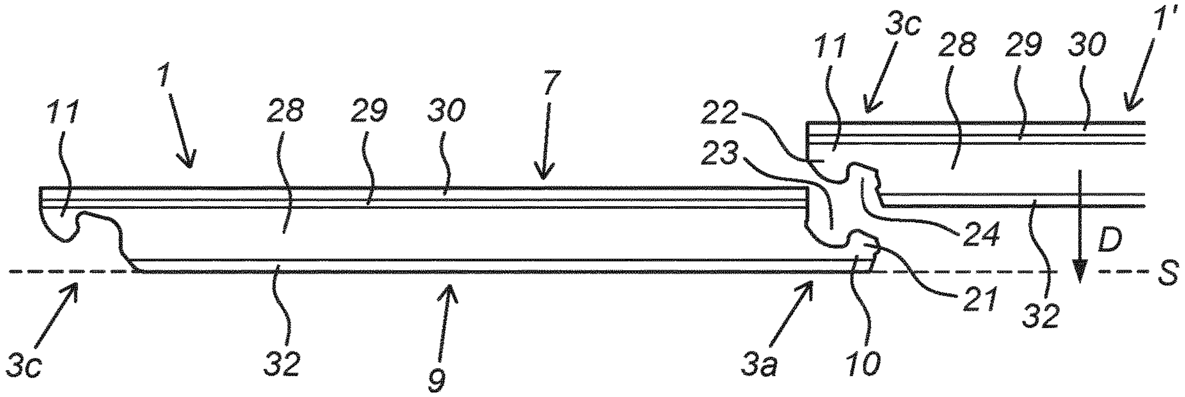
FIG. 2 shows a cross-sectional view of two panels and their coupling profiles according to the invention.

FIG. 2 shows a cross-section of the panel 1 of FIG. 1, perpendicular to the first and second side edges 3*a* and 3*c*, which are provided with a first profile 10 and a second profile 11. The bottom side 9 of the panel 1, is laid on a substrate layer for instance a floor surface S. The panel 1 has a structure of laminated layers 28, 29, 30 and 32 that are adhered to each other, which layers extend parallel to the plane of the panel 1, and comprise:

a core layer 28 having a lower side and an upper side, a decorative layer 29 which comprises a decorative image on its upper side such as for instance the graining lines 12 of FIG. 1, a top coat layer 30 which is adhered on the upper side of the decorative layer 29, and a backing layer 32 which is adhered on the lower side of the core layer 28.

Further in FIG. 2, another identical panel 1' is shown in part, of which the second side edge 3*c* is to be coupled to the panel 1, by a downward vertical movement indicated by vector D.

The first profile 10 and the second profile 11 of both panels 1 and 1' are mutually interacting profiles that can be coupled to each other and are complementary to each other. During coupling, the second profile 11 of panel 1' is vertically inserted in the first profile 10 of panel 1, which involves the downward tongue 22 of panel 1' being inserted in the first groove 23 of panel 1, and the upward tongue 21 of panel 1 being inserted in the second groove 24 of panel 1'. When coupled, the panels 1 and 1' lie in a common plane which is parallel to the floor surface S.

Figure 3:
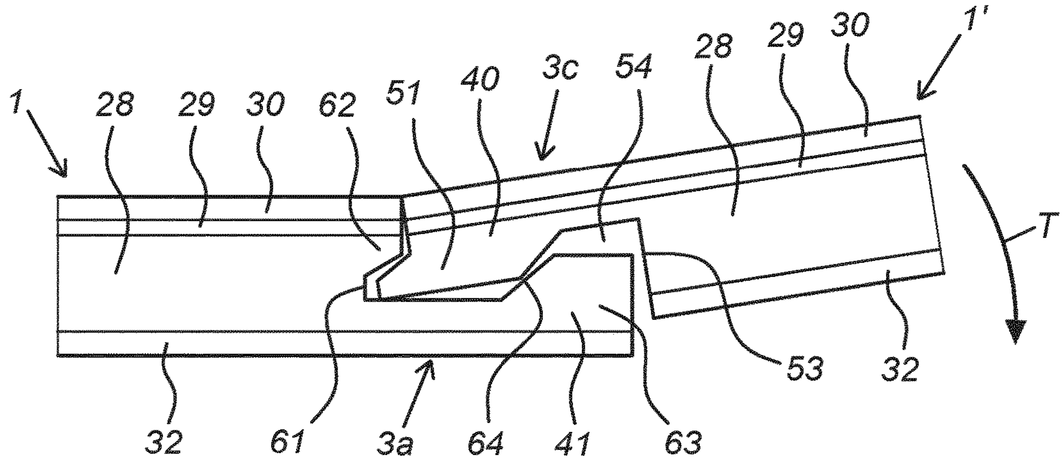
FIG. 3 shows a cross-sectional view of two panels having alternative coupling profiles according to the invention.

FIG. 3 shows analogous to FIG. 2, alternative coupling profiles 40 and 41 for connecting two panels 1 and 1' with each other. Features that are equal to the features of FIG. 2 are indicated by the same reference numerals.

The first profile 40 of panel 1', comprises a sideward tongue 51 extending in a direction substantially parallel to the upper side of the panel, one downward flank 53 lying at a distance from the sideward tongue 51, and a downward groove 54 formed between the sideward tongue 51 and the downward flank 53.

The second profile 41 of panel 1, comprises a groove 61 configured for accommodating at least a part of the sideward tongue 51 of the first profile 40 of a second identical panel 1', said groove 61 being defined by an upper lip 62 and a lower lip 63, wherein said lower lip is provided with an upward locking element 64.

In the situation shown in FIG. 3, the first coupling profile and the second coupling profile 6 are configured such that the respective panels 1 and 1', can be coupled to each other by means of an angling movement as indicated by arrow T, which involves the sideward tongue of panel 1' being inserted into the third groove of the other identical panel 1, wherein the upward locking element 64 of the panel 1, is inserted into the second downward groove 54 of the panel 1'.

It is also envisaged by the invention, that coupling profiles 40 and 41 are provided on the side edges 3*b* and 3*d*, while the side edges 3*a* and 3*c* are provided with alternative coupling profiles 10 and 11 as shown in FIG. 2.

Figure 4:
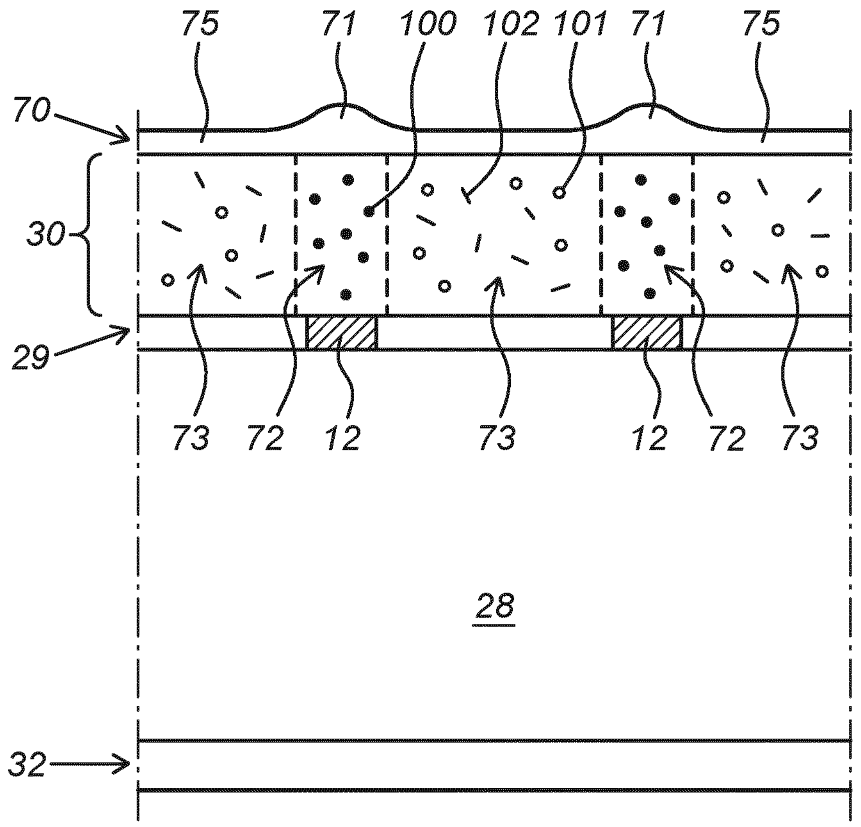
FIG. 4 shows a detailed cross-section of a part of the panel.

FIG. 4 shows a detailed cross-section of a part of the panel shown in FIG. 2, wherein parts of the panel that are identical to FIG. 2 are indicated by the same reference numbers. It is noted that the relative thickness of the respective layers is exaggerated for illustrative reasons and therefore differs from FIG. 2.

The decorative layer 29 is provided with grain lines 12, above which vertical zones 72 and 73 extend which are indicated by the vertical dotted lines. The vertical zones 72 and 73 divide the top coat layer 30 made of transparent matrix material in adjacent sections wherein each vertical zone comprises a predetermined amount of three types of solid particles 100, 101, 102 which have light-interacting properties and which comprise:

spheroid, light reflective solid particles 101 that have an outer surface of light reflective material;

spheroid, light absorbing solid particles 100 that have an outer surface of light absorbing material; and/or flake-formed, transparent solid particles 102 that are made from a transparent material which has a different refractive index than the transparent matrix material.

The solid particles in zones 72 are light absorbing solid particles 100 which correspond to the grain lines 12 image parts of the decorative image that are of a dark colour. The zones 73 contains light reflective solid particles 101 and transparent solid particles 102, in order to enhance the visual appearance of the part of the decorative image which does not contain grain lines 12, and which part is of a light colour.

Additionally, the top coat layer 30 comprises at its upper side a relief structure, formed by a layer 70 of transparent material comprises recessed parts 75 and elevated parts 71, which parts are provided in correspondence with the decorative image of the decorative layer, such that the elevated parts 71 correspond with the grain lines 12.

The above-described inventive concepts are illustrated by several illustrative embodiments. It is conceivable that individual inventive concepts may be applied without, in so doing, also applying other details of the described examples.

The verb "comprise" and conjugations thereof used in this patent publication are understood to mean not only "comprise", but are also understood to mean the phrases "contain", "substantially consist of", "formed by" and conjugations thereof. Expression like "vertical" and "horizontal" are relative expressions and relate to a plane defined by the panel, wherein "vertical" means a direction perpendicular to said plane, and wherein "horizontal" means a direction parallel to and/or coinciding with said plane.

The invention claimed is:

1. A decorative panel, of a planar design having a top side, a bottom side and side edges, which panel is constructed from a laminate structure of layers that are adhered to each other, wherein the layers include:

at least one core layer, at least one decorative layer which comprises a decorative image, which decorative layer is affixed, either directly or indirectly, on an upper side of the core layer, and at least one substantially transparent top coat layer, affixed, either directly or indirectly, on an upper side of the decorative layer, wherein said top coat layer comprises an at least partially transparent matrix material, and a plurality of chips dispersed in said matrix material, wherein the chips have light-interacting properties and comprise one or more of the following types of chips:

light reflective chips that have an outer surface of light reflective material, such that more than 50% of incident light is reflected; and light absorbing chips that have an outer surface of light absorbing material, such that more than 50% of incident light is absorbed.

2. The panel according to claim 1, wherein the chips are shaped as non-spheroid particles including rectangular or polyhedral particles, or flake-formed particles.

3. The panel according to claim 1, wherein the chips are composed of a composite material, which composite material comprises at least one polymeric material and at least one non-polymeric material.

4. The panel according to claim 1, wherein the chips comprises at least one polymeric material and at least one light reflective non-polymeric flake.

5. The panel according to claim 4, wherein the light reflective non-polymeric flake is at least partially composed of a material chosen from the group consisting of: mica, metal, metal oxide, a non-metal, pearls, and glass flakes.

6. The panel according to claim 4, wherein said chips additionally comprises at least one filler dispersed in said polymeric material, wherein said filler selected from the group consisting of: aluminium hydroxide, magnesium hydroxide, calcium hydroxide, zirconium hydroxide, aluminium, calcium carbonate, magnesium oxide, titanium oxide, barium sulphate, silica, quartz, talc, clay, diatomaceous earth, gypsum, powder glass, montmorillonite, bentonite, pyrophyllite, kaolin, powder chalk, marble, limestone, asbestos, mullite, aluminium silicate, aluminium stearate, calcium silicate, anhydrite, α-cristobalite, and alumina white.

7. The panel according to claim 4, wherein said composite material comprises a laminate of a first layer based upon said at least one polymeric material, and a second layer based upon the at least one light reflective non-polymeric flake.

8. The panel according to claim 1, wherein the chips comprises a cured composition comprising a binder at least partially composed of a halogenated alkoxylated diacrylate oligomer or halogenated alkoxylated dimethacrylate oligomer.

9. The panel according to claim 1, wherein the difference in specific gravity between the chips and the matrix material is less than 0.5 g/cm3.

10. The panel according to claim 1, wherein the chips have a specific gravity of 1.43 to 1.77 g/cm3.

11. The panel according to claim 1, wherein the matrix material has a specific gravity of 1.50 to 1.85 g/cm3.

12. The panel according to claim 1, wherein the specific gravity difference between the matrix material and the chips is 1.85 g/cm3 or less.

13. The panel according to claim 1, wherein the chips are crushed chips.

14. The panel according to claim 1, wherein the at least partially transparent matrix material of the top coat layer comprises a vinyl polymer or a thermosetting polymer material; and at least one non-polymeric additive selected from the group consisting of: aluminium oxide, aluminium hydroxide, barium, precipitated calcium carbonate, stone powders, silica, titanium dioxide, calcium carbonate, metal powder, and a metal salt.

15. The panel according to claim 1, wherein the top coat layer, in particular the matrix material, comprises at least one semi-transparent or opaque zone.

16. The panel according to claim 1, wherein the chips are positioned in the transparent matrix material such that their position is in correspondence with the decorative image of the decorative layer.

17. The panel according to claim 1, wherein the light reflective chips are positioned in correspondence with image parts of the decorative image that are:

image parts of a light colour, or image parts that depict an elevated zone of a depicted relief structure.

18. The panel according to claim 1, wherein the light absorbing chips are positioned in correspondence with parts of the decorative image that are:

image parts of a dark colour, or image parts that depict a recessed zone of a depicted relief structure.

19. The panel according to claim 1, wherein the panel comprises at least two opposite side edges which are provided with respective interconnecting profiles that are complementary to each other.

* * * * *